United States Patent
Gschwend et al.

(10) Patent No.: US 11,808,196 B2
(45) Date of Patent: Nov. 7, 2023

(54) METHOD OF DETECTING A NEED FOR REGENERATION OF AN EXHAUST PARTICULATE FILTER, AND EXHAUST SYSTEM

(71) Applicant: HUG Engineering AG, Elsau (CH)

(72) Inventors: Dominik Gschwend, Elsau (CH); Adrian Marberger, Elsau (CH); Marc Hehle, Elsau (CH); Simon Schiegg, Elsau (CH); Dominik Frueh, Elsau (CH)

(73) Assignee: HUG Engineering AG

( * ) Notice: Subject to any disclaimer, the term of this patent is extended or adjusted under 35 U.S.C. 154(b) by 0 days.

(21) Appl. No.: 17/751,846

(22) Filed: May 24, 2022

(65) Prior Publication Data
US 2022/0381173 A1 Dec. 1, 2022

(30) Foreign Application Priority Data
May 27, 2021 (DE) .................... 10 2021 113 763.2

(51) Int. Cl.
*F01N 9/00* (2006.01)
*B01D 46/00* (2022.01)
(Continued)

(52) U.S. Cl.
CPC ......... *F01N 9/002* (2013.01); *B01D 46/0086* (2013.01); *B01D 46/444* (2013.01);
(Continued)

(58) Field of Classification Search
CPC combination set(s) only.
See application file for complete search history.

(56) References Cited

U.S. PATENT DOCUMENTS 7,055,309 B2 6/2006 Plote et al.
8,608,835 B2 12/2013 Busch
(Continued)

FOREIGN PATENT DOCUMENTS

CN 109708895 A 5/2019
DE 10213660 A1 4/2003
(Continued)

OTHER PUBLICATIONS

German Search Report for Application No. 10 2021 113 763.2, filed on May 27, 2021.
(Continued)

*Primary Examiner* — Binh Q Tran
(74) *Attorney, Agent, or Firm* — Carlson, Gaskey & Olds, P.C.

(57) ABSTRACT

A method of detecting a need for regeneration of an exhaust particulate filter is described. A first pressure drop is detected in a flow section of an exhaust system which includes the exhaust particulate filter. In addition, an exhaust gas temperature is determined. An exhaust gas mass flow flowing through the exhaust particulate filter is then calculated on the basis of the exhaust gas temperature and the pressure drop. Furthermore, a second pressure drop at the exhaust particulate filter is determined. A need for regeneration is detected when the second pressure drop exceeds a predefined pressure limit value that is dependent on the exhaust gas mass flow. Moreover, an exhaust system for an internal combustion engine is presented which includes an exhaust particulate filter.

19 Claims, 1 Drawing Sheet

(51) Int. Cl.
*B01D 46/44* (2006.01)
*B01D 53/94* (2006.01)
*F01N 3/023* (2006.01)
*F01N 3/10* (2006.01)
*F01N 3/20* (2006.01)
*F01N 11/00* (2006.01)

(52) U.S. Cl.
CPC ......... *B01D 46/448* (2013.01); *B01D 53/944* (2013.01); *B01D 53/9431* (2013.01); *F01N 3/023* (2013.01); *F01N 3/106* (2013.01); *F01N 3/2066* (2013.01); *B01D 2279/30* (2013.01); *F01N 3/0231* (2013.01); *F01N 3/0233* (2013.01); *F01N 3/2093* (2013.01); *F01N 9/005* (2013.01); *F01N 11/002* (2013.01); *F01N 11/005* (2013.01); *F01N 2550/04* (2013.01); *F01N 2550/12* (2013.01); *F01N 2560/07* (2013.01); *F01N 2560/08* (2013.01); *F01N 2900/1404* (2013.01); *F01N 2900/1406* (2013.01); *F01N 2900/16* (2013.01); *F01N 2900/1808* (2013.01); *F01N 2900/1811* (2013.01)

(56) References Cited

U.S. PATENT DOCUMENTS

| | | |
|---|---|---|
| 9,046,017 B2 | 6/2015 | Nakazato et al. |
| 2003/0225506 A1 | 12/2003 | Plote et al. |
| 2008/0104948 A1* | 5/2008 | Kapparos ............... F01N 9/002 60/297 |
| 2009/0084097 A1* | 4/2009 | Sato ...................... F01N 11/002 73/114.76 |
| 2010/0132558 A1 | 6/2010 | Busch |
| 2012/0192635 A1* | 8/2012 | Ide ......................... F01N 11/00 73/114.76 |
| 2012/0210697 A1* | 8/2012 | Garimella ............. F01N 13/009 60/287 |
| 2014/0116247 A1 | 5/2014 | Nakazato et al. |
| 2018/0340460 A1 | 11/2018 | Srinivasan |
| 2019/0063284 A1* | 2/2019 | Santillo ................ F01N 11/002 |
| 2020/0025054 A1* | 1/2020 | Barve ................... B01D 37/046 |
| 2021/0003060 A1* | 1/2021 | Srinivasan ........... F01N 11/002 |

FOREIGN PATENT DOCUMENTS

| | | |
|---|---|---|
| DE | 102006024089 A1 | 11/2007 |
| DE | 112012000088 B4 | 1/2018 |
| DE | 102017209080 A1 | 12/2018 |
| EP | 2078143 B1 | 7/2009 |
| KR | 100857346 B1 | 9/2008 |
| WO | 9403711 A1 | 2/1994 |
| WO | 2016133443 A1 | 8/2016 |
| WO | 2016144492 A1 | 9/2016 |

OTHER PUBLICATIONS

European Search Report dated Sep. 9, 2022 for German Application No. 10 2021 113 763.2.

* cited by examiner

METHOD OF DETECTING A NEED FOR REGENERATION OF AN EXHAUST PARTICULATE FILTER, AND EXHAUST SYSTEM

CROSS-REFERENCE TO RELATED APPLICATIONS

This application is a U.S. non-provisional application claiming the benefit of German Application No. 10 2021 113 763.2, filed on May 27, 2021, which is incorporated herein by reference in its entirety.

TECHNICAL FIELD

The disclosure relates to a method of detecting a need for regeneration of an exhaust particulate filter.

Furthermore, the disclosure is directed to an exhaust system for an internal combustion engine, which comprises an exhaust particulate filter. Further provided is a flow section that is connected to the exhaust particulate filter in a fluidically unbranched manner. The exhaust system also has a first pressure sensor arrangement for sensing a first pressure drop across the flow section, a second pressure sensor arrangement for sensing a second pressure drop across the exhaust particulate filter, and a temperature sensor for sensing an exhaust gas temperature.

BACKGROUND

Exhaust systems and methods for detecting a need for regeneration of exhaust particulate filters are known from the prior art.

During operation of the exhaust system, particulate matter is deposited on the exhaust particulate filter. In principle, this is desirable, since in this way the particles are not released into an environment, that is, the exhaust gas is purified. However, this increases a flow resistance produced by the exhaust particulate filter. In order not to impair the proper functioning of the exhaust system, the flow resistance must not become too large. In addition, an increased flow resistance also causes increased fuel consumption of an internal combustion engine coupled to the exhaust system. Known exhaust particulate filters therefore have to be regenerated at regular intervals. In this process, the particulate matter deposited on the exhaust gas filter is combusted in a controlled manner so that the flow resistance is reduced. To this end, the exhaust gas temperature is usually selectively raised for a certain period of time. A burner in which fuel is burned can be employed for this purpose. Alternatively, the exhaust gas temperature can be raised by the internal combustion engine coupled to the exhaust system.

SUMMARY

The disclosure provides an improved exhaust system. that features a comparatively low fuel consumption and/or brings about low fuel consumption in an internal combustion engine coupled to the exhaust system.

A method includes the steps of:
(a) detecting a first pressure drop in a flow section of an exhaust system which includes the exhaust particulate filter, the flow section being connected to the exhaust particulate filter in a fluidically unbranched manner;
(b) sensing an exhaust gas temperature;
(c) calculating an exhaust gas mass flow flowing through the exhaust particulate filter on the basis of the first pressure drop and the exhaust gas temperature;
(d) determining a second pressure drop across the exhaust particulate filter; and
(e) identifying the need for regeneration when the second pressure drop exceeds a predefined pressure limit value dependent on the exhaust gas mass flow.

The exhaust gas mass flow can be calculated with high precision using the pressure drop at the flow section and the exhaust gas temperature. This calculation can be carried out within a control device of an exhaust system. It is therefore not required to pass on data on the exhaust gas mass flow, for example, from an internal combustion engine to the exhaust system. The exhaust system is therefore independent in this respect. This makes it well suited to be retrofitted and/or used in conjunction with internal combustion engines that are only produced in small numbers. Because of the fact that the detection of the need for regeneration is dependent on the exhaust gas mass flow, the need for regeneration can be determined as required. This means that regeneration is not carried out after fixed time intervals or upon exceeding a fixed pressure limit value, independent of the exhaust gas mass flow, for the second pressure drop or dynamic pressure at the exhaust particulate filter. In the present case, in particular for higher exhaust gas mass flows a higher pressure limit value is used than for lower exhaust gas mass flows. Compared with known methods, fewer regeneration processes are therefore necessary over a service life of an associated exhaust system. This reduces fuel consumption, the associated $CO_2$ emissions and the operating costs for the exhaust system and internal combustion engines equipped therewith.

The following equations are used for determining the mass flow based on the pressure drop.

$$\Delta p = \frac{1}{2} \rho \zeta v^2 \quad (1)$$

$$\dot{m} = \rho v A \quad (2)$$

Here, $\dot{m}$ is the exhaust gas mass flow. $\Delta p$ denotes the pressure drop. The density is denoted by $\rho$ and the flow velocity by v. A flow cross-section is denoted by A. $\zeta$ is used to indicate a pressure coefficient that depends only on the geometry of the flow section under consideration.

The equations (1) and (2) indicated above can be inserted into one another so that the mass flow can be calculated on the basis of the pressure drop. In this context, the density is temperature-dependent and can therefore be determined on the basis of an exhaust gas temperature.

The pressure coefficient $\zeta$ results from a plurality of phenomena. First of all, the geometries of the components forming the flow section have an influence. This portion of the pressure coefficient can be determined, for example, in a simulation or by a measurement during initial operation of an exhaust system.

The accumulation or attachment of particles in the exhaust particulate filter also has an impact on the effectively acting pressure coefficient $\zeta$. In this connection, a distinction can first be made between soot particles and ash particles. Soot particles can be combusted as part of a regeneration and can thus be removed from the exhaust particulate filter. Ash particles, on the other hand, cannot be combusted any more and therefore attach themselves to the exhaust particulate filter over the entire service life thereof. A portion of the pressure coefficient $\zeta$ brought about by the soot particles can therefore be essentially set to zero by a regeneration. A portion of the pressure coefficient $\zeta$ caused by the ash particles increases continuously over the service life of the exhaust particulate filter. It cannot essentially be changed by regeneration.

These phenomena are taken into account when a need for regeneration is detected on an as-needed basis in that the pressure limit value is dependent on the exhaust gas mass flow. In this context, it can be found in particular that at the beginning of a service life of the exhaust particulate filter, the time intervals between two regeneration processes are comparatively large. In contrast, towards the end of the service life of the exhaust particulate filter, when the proportion of the pressure coefficient $\zeta$ caused by ash particles is already comparatively large, the time intervals between two regeneration processes are short. The proportion of the pressure coefficient $\zeta$ caused by ash particles can also be made use of to estimate a remaining service life of the exhaust particulate filter and/or a time until pending maintenance, during which the deposited ash particles are at least partly removed. The proportion of the pressure coefficient $\zeta$ caused by ash particles can be established on the basis of an effectively acting pressure coefficient $\zeta$ by setting the proportion of the pressure coefficient $\zeta$ brought about by soot particles essentially to zero by a regeneration and, in addition, by deducting the proportion caused only by the geometry of the components constituting the flow section.

The method according to the disclosure as well as the exhaust system according to the disclosure, to be described in even more detail below, are used in particular in conjunction with powerful internal combustion engines, which are often referred to as large engines. Such engines can provide a power of more than 500 kW. They are employed, for example, in vessels, emergency power generators or locomotives.

The predefined pressure limit value may further depend on a further exhaust gas temperature prevailing at the exhaust particulate filter. In particular, this exhaust gas temperature is detected at a flow inlet of the exhaust particulate filter. Thus, the pressure limit value is dependent on both the exhaust gas mass flow and the temperature of the exhaust gas mass flow. This is tantamount to the predefined pressure limit value being dependent on an exhaust gas volume flow that passes through the exhaust particulate filter. Conversion between the exhaust gas mass flow and the exhaust gas volume flow is performed through the density, which, as already discussed, is temperature-dependent and can thus be determined on the basis of the further exhaust gas temperature. In this way, a need for regeneration can be ascertained with particularly high precision, so that, altogether, advantageous consumption values and operating costs are achieved.

The flow section may include at least one of an SCR catalytic converter and an oxidation catalytic converter, and the first pressure drop may be determined across at least one of the SCR catalytic converter and the oxidation catalytic converter. Thus, in this embodiment, the exhaust gas mass flow that flows through the exhaust particulate filter is determined on the basis of the pressure drop that occurs across the SCR catalytic converter and/or the oxidation catalytic converter. Since the flow section is connected to the exhaust particulate filter in a fluidically unbranched manner, the exhaust gas mass flows that flow through the exhaust particulate filter and the flow section are substantially of the same size. This allows the mass flow to be determined reliably and precisely.

Advantageously, the exhaust gas temperature is an exhaust gas temperature prevailing at the SCR catalytic converter and/or at the oxidation catalytic converter. In particular, the exhaust gas temperature is detected at a flow inlet of the SCR catalytic converter. The exhaust gas temperature thus involves the exhaust gas stream at the same point at which the first pressure drop occurs. This means that the mass flow can be calculated with particularly high precision.

A nitrogen oxide concentration of an exhaust gas volume flow or exhaust gas mass flow that flows in the exhaust system may also be determined as part of the method. This may be performed in a manner known per se using a nitrogen oxide concentration sensor, which is also referred to as a NOx sensor for short. The NOx sensor is arranged upstream of the exhaust particulate filter, for example.

If both the nitrogen oxide concentration and the associated exhaust gas mass flow are known, an absolute quantity, or more precisely a mass flow, of nitrogen oxides can be determined. Consequently, a mass flow or volume flow of reducing agent injected into the exhaust gas stream upstream of the SCR converter can be precisely adapted to the mass flow of nitrogen oxides. As a result, the injected reducing agent essentially fully reacts with the nitrogen oxides contained in the exhaust gas stream. Consequently, neither an excess of reducing agent nor an excess of nitrogen oxides is released into the environment. This results in emission values that meet strict regulations.

The reducing agent involved is, for example, urea.

In one variant, the pressure limit value is provided in the form of a characteristic map. In this characteristic map, an exhaust gas mass flow or an exhaust gas volume flow, for example, is plotted along an x-axis. The associated y-axis pertains to the second pressure drop. The pressure limit value is then obtained as a curve in this characteristic map. This curve may be determined, for example, by a simulation and/or by experiments. The curve may also be determined by interpolating between individual operating points represented in the characteristic map. All in all, this allows pressure limit values to be provided simply and reliably.

Furthermore, a future need for regeneration may be identified when the second pressure drop exceeds a predefined pressure warning value, the pressure warning value being smaller than the pressure limit value. Identifying a future need for regeneration here corresponds to a kind of early warning with reference to the acute need for regeneration. Depending on the operating strategy of the exhaust system via which the method is carried out, a regeneration may already be carried out when the pressure warning value has been exceeded but the pressure limit value has not yet been reached, depending on further operating parameters. In this way, a long service life of the exhaust system is achieved, since situations can thus be avoided in which regeneration is necessary but not possible due to external circumstances and/or current performance requirements.

The object is additionally achieved by an exhaust system of the kind mentioned at the outset, which includes a control device which is coupled to the first pressure sensor arrangement, the second pressure sensor arrangement and the temperature sensor in terms of signaling, the control device being configured to (f) determine an exhaust gas mass flow flowing through the exhaust particulate filter on the basis of a first pressure drop detected by the first pressure sensor arrangement and an exhaust gas temperature sensed by the temperature sensor; and (g) identify a need for regeneration of the exhaust particulate filter when the second pressure drop detected by the second pressure sensor arrangement exceeds a predefined pressure limit value dependent on the exhaust gas mass flow.

As already discussed, in an exhaust system of this type, an exhaust gas mass flow can be determined with a high degree of reliability and precision. This allows a regeneration of the exhaust particulate filter to be performed as required, so that in contrast to purely time-controlled regeneration intervals, a reduced fuel consumption of the exhaust system and of an internal combustion engine equipped therewith is achieved. The same holds true for regeneration intervals that are determined merely on the basis of a limit value for the second pressure drop or a dynamic pressure that is measured at the exhaust particulate filter and is not dependent on the exhaust gas mass flow.

The control device may additionally be configured to identify a future need for regeneration when the second pressure drop exceeds a predefined pressure warning value, the pressure warning value being smaller than the pressure limit value. The effects and advantages already discussed with respect to the method are obtained.

The exhaust system may also include a further temperature sensor which is arranged in or on the exhaust particulate filter and is connected to the control device in terms of signaling. In this way, the exhaust gas temperature prevailing at the exhaust particulate filter can be sensed with high precision. This allows a density of the exhaust gas mass flow passing through the exhaust particulate filter to be calculated. The exhaust gas mass flow can consequently be converted into an exhaust gas volume flow and vice versa.

In one variant, at least one of an SCR catalytic converter and an oxidation catalytic converter is arranged in the flow section, the flow section being positioned downstream of the exhaust particulate filter. This means that the first pressure drop is measured across the SCR catalytic converter and/or the oxidation catalytic converter. In this way, the exhaust gas mass flow can be reliably determined. Consequently, the exhaust particulate filter can be regenerated as needed. In this connection, the oxidation catalytic converter may be seated in the same housing as the SCR catalytic converter.

Moreover, the effects and advantages discussed with regard to the method according to the disclosure also apply to the exhaust system according to the disclosure and vice versa.

DESCRIPTION OF THE DRAWINGS

Figure 1:
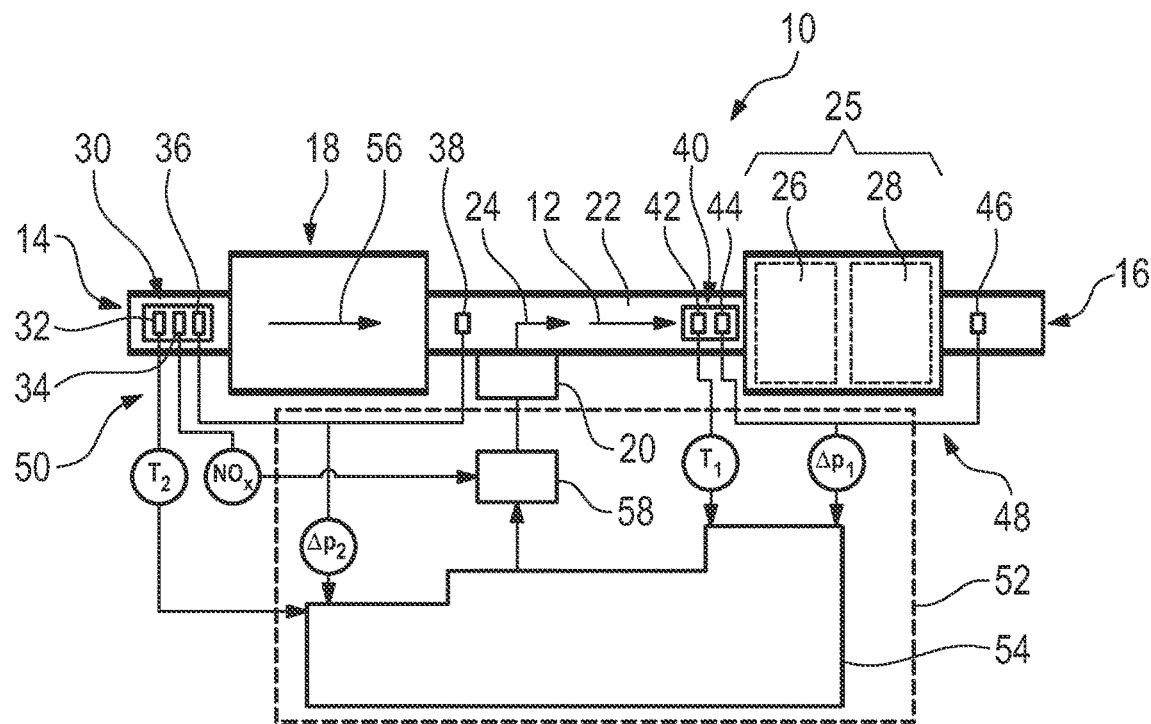
FIG. 1 shows an exhaust system for an internal combustion engine.

The disclosure will be explained below with reference to an exemplary embodiment, which is illustrated in the accompanying drawings, in which:

(h) schematically shows an exhaust system according to the disclosure, by which a method according to the disclosure can be carried out; and (i) shows a characteristic map in which pressure limit values and pressure warning values, which are dependent on an exhaust gas volume flow rate, for a pressure drop across the exhaust particulate filter of the exhaust system of FIG. 1 are plotted.

FIG. 1 shows an exhaust system 10 for an internal combustion engine.

Here, an exhaust gas mass flow 12, symbolized by an arrow, can flow into the exhaust system 10 on an inlet side 14 and flow out of it on an outlet side 16.

Along the flow direction from the inlet side 14 to the outlet side 16, the exhaust system 10 comprises an exhaust particulate filter 18, a reducing agent dosing device 20 and a mixing section 22, which is configured to mix the exhaust gas mass flow 12 with a volume flow 24 of reducing agent.

The mixing section 22 is adjoined downstream by a flow section 25 of the exhaust system 10, in which an SCR catalytic converter 26, i.e. a catalytic converter the effect of which is based on selective catalytic reduction, and an oxidation catalytic converter 28 are arranged.

Here, the SCR catalytic converter 26 and the oxidation catalytic converter 28 are arranged in a shared housing.

The flow section 25 is connected to the exhaust particulate filter 18 in a fluidically unbranched manner here.

Such exhaust systems 10 are frequently used in combination with internal combustion engines that operate on the diesel principle. In this connection, the exhaust particulate filter 18 is also referred to as a diesel particulate filter (DPF).

The exhaust system 10 is further equipped with numerous sensors.

In this context, a first sensor arrangement 30 is positioned at the exhaust particulate filter 18 on an upstream side, which comprises a temperature sensor 32, a nitrogen oxide concentration sensor 34, and a pressure sensor 36.

A further pressure sensor 38 is positioned downstream at the exhaust particulate filter 18.

A further sensor arrangement 40 is provided at an upstream end of the SCR catalytic converter 26 and comprises a temperature sensor 42 and a pressure sensor 44.

A further pressure sensor 46 is positioned downstream of the oxidation catalytic converter 28.

In this context, the pressure sensor 44 and the pressure sensor 46 constitute a first pressure sensor arrangement 48 for sensing a first pressure drop $\Delta p_1$ across the flow section 25.

In this context, a respective absolute pressure can be sensed by the pressure sensors 44, 46. The first pressure drop $\Delta p_1$ is then determined by calculating a difference between these absolute pressures.

Alternatively, the pressure sensors 44, 46 can form a differential pressure sensor of which the first pressure drop $\Delta p_1$ can be sensed directly.

The pressure sensors 36 and 38 constitute a second pressure sensor arrangement 50 for sensing a second pressure drop $\Delta p_2$ across the exhaust particulate filter 18.

The pressure sensors 36, 38 can also each sense an absolute pressure. The second pressure drop $\Delta p_2$ is then determined by calculating a difference between these absolute pressures.

Likewise, it is possible for the pressure sensors 36, 38 to form a differential pressure sensor, via which the second pressure drop $\Delta p_2$ can be directly sensed.

The exhaust system 10 further comprises a control device 52.

The control device is coupled to all of the aforementioned sensors in terms of signaling.

This means that in terms of signaling, the control device 52 is coupled to the pressure sensors 36, 38, 44, 46, the temperature sensors 32, 42 and the nitrogen oxide concentration sensor 34.

Here, the control device 52 comprises a first arithmetic unit 54, which is configured to determine an exhaust gas mass flow 12 flowing through the exhaust particulate filter 18 on the basis of the first pressure drop Δp1 determined by the first pressure sensor arrangement 48 and an exhaust gas temperature T1 sensed by the temperature sensor 42.

To this end, first the pressure drop $\Delta p_1$ is measured by the pressure sensor arrangement 48.

Based on the temperature $T_1$ determined by the temperature sensor 42, a density of the exhaust gas mass flow 12 can be calculated. Here, temperature-dependent density values of exhaust gas are stored on the arithmetic unit 54.

The values for the first pressure drop $\Delta p_1$ and the density can be inserted into the above-mentioned equations (1) and (2) so that the exhaust gas mass flow 12 can be determined.

Furthermore, the second pressure drop $\Delta p_2$ can be detected by the control device 52, in particular by the arithmetic unit 54. The pressure sensor arrangement 50 is used for this purpose.

In addition, an exhaust gas volume flow 56 flowing through the exhaust particulate filter 18 can be determined by using the control device 52.

To this end, a temperature $T_2$ sensed by the temperature sensor 32 is used to determine a density of the exhaust gas stream flowing into the exhaust particulate filter 18. Again, the density values stored on the control device 52 are made use of for this purpose.

In addition, the exhaust gas mass flow 12 is used, which was calculated using the first pressure drop $\Delta p_1$ in the flow section 25 and the temperature $T_1$ sensed by the temperature sensor 42.

On the basis of the exhaust gas mass flow 12 and the density, the exhaust gas volume flow 56 can now be determined.

The control device 52, in particular the arithmetic unit 54, is also configured to detect a need for regeneration of the exhaust particulate filter 18.

Figure 2:
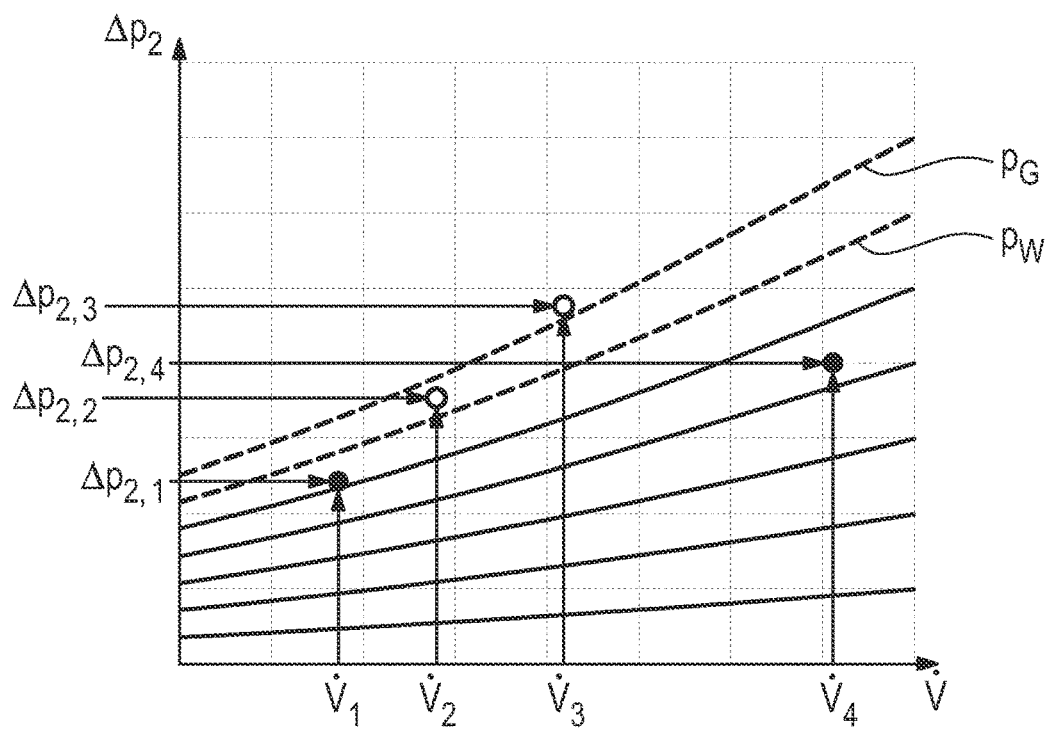
FIG. 2 shows a characteristic map comprising an exhaust gas volume flow-second pressure drop diagram.

For this purpose, the characteristic map according to FIG. 2 is stored on the arithmetic unit 54.

In this connection, the characteristic map comprises, in an exhaust gas volume flow-second pressure drop diagram, a first curve which represents a pressure limit value $p_G$ as a function of the exhaust gas volume flow $\dot{V}$, 56.

Furthermore, the characteristic map comprises a second curve that represents a pressure warning value pw as a function of the exhaust gas volume flow $\dot{V}$, 56.

Since, as discussed above, the exhaust gas volume flow 56 can be calculated on the basis of the exhaust gas mass flow 12 and the temperature $T_2$ detected by the temperature sensor 32, the curves for the pressure limit value $p_G$ and the pressure warning value pw are thus also plotted as a function of the exhaust gas mass flow 12 and the temperature $T_2$. This is equivalent to a dependence on the exhaust gas volume flow $\dot{V}$, 56.

Therefore, during operation of the exhaust system 10, a future need for regeneration is detected when, at an exhaust gas volume flow $\dot{V}$, 56, the second pressure drop $4_2$ exceeds the predefined pressure warning value pw represented by the second curve.

When a future need for regeneration is identified, depending on further operating parameters of the exhaust system 10 a regeneration may be carried out immediately, in which particulate matter collected by the exhaust particulate filter 18 is burned off in a controlled manner.

Alternatively, such a regeneration may also be held off for a certain period of time.

In operation of the exhaust system 10, a need for regeneration is further detected when at an exhaust gas volume flow $\dot{V}$, 56, the second pressure drop $\Delta p_2$ exceeds the predefined pressure limit value $p_G$ represented by the second curve. In such a case, regeneration of the exhaust particulate filter 18 is necessary immediately or at least within a short time.

Such a need for regeneration may also be referred to as an acute need for regeneration.

To further illustrate the detection of the need for regeneration, four operating points have been drawn into the characteristic map of FIG. 2 by way of example.

Here, with the respectively associated volume flows $\dot{V}_1$ and $\dot{V}_4$, the second pressure drop $\Delta p_{2,1}$ and the second pressure drop $\Delta p_{2,4}$ are below the curve representing the pressure warning value $p_w$. Thus, for these operating points, there is neither a future nor an acute need for regeneration.

The second pressure drop $\Delta p_{2,2}$ which is determined at the exhaust gas volume flow $\dot{V}_2$, is above the curve representing the pressure warning value pw but below the curve representing the pressure limit value $p_G$. Thus, in this operating point, a future need for regeneration is detected.

The second pressure drop $\Delta p_{2,3}$, which is measured at the exhaust gas volume flow $\dot{V}_3$, is above the curve representing the pressure limit value $p_G$. Therefore, an acute need for regeneration is detected here.

With reference to the above equation (1), this means that a regeneration is recognized as being necessary if those components of the pressure coefficient ζ which are brought about by soot particles and ash particles have increased to such an extent that, for a given exhaust gas mass flow 12 or a given exhaust gas volume flow $\dot{V}$, 56, an associated second pressure drop $\Delta p_2$ ensues which is above the pressure limit value $p_G$.

The control device 52 furthermore comprises a second arithmetic unit 58, which is configured to control the volume flow 24 of reducing agent, that is, to provide a volume flow 24 of reducing agent suitable for the exhaust gas mass flow 12.

The arithmetic unit 58 is therefore coupled to the reducing agent dosing device 20 in terms of signaling.

In addition, the control device 52, more specifically the second arithmetic unit 58, is coupled to the nitrogen oxide concentration sensor 34 in terms of signaling. Furthermore, the already determined value for the exhaust gas mass flow 12 is available to the arithmetic unit 58.

Based on these characteristic values, a mass flow of nitrogen oxides can be determined.

This also allows a suitable volume flow 24 of reducing agent that is to be injected into the mixing section 22 to be adjusted.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A method of detecting a need for regeneration of an exhaust particulate filter, comprising the steps of:
   (a) detecting a first pressure drop in a flow section of an exhaust system comprising the exhaust particulate filter, the flow section being connected to the exhaust particulate filter in a fluidically unbranched manner;
   (b) sensing an exhaust gas temperature;

(c) calculating an exhaust gas mass flow flowing through the exhaust particulate filter on the basis of the first pressure drop and the exhaust gas temperature;
(d) determining a second pressure drop across the exhaust particulate filter; and
(e) identifying the need for regeneration when the second pressure drop exceeds a predefined pressure limit value dependent on the exhaust gas mass flow.

2. The method according to claim 1, wherein the predefined pressure limit value depends on a further exhaust gas temperature prevailing at the exhaust particulate filter.

3. The method according to claim 1, wherein the flow section comprises at least one of an SCR catalytic converter and an oxidation catalytic converter, and the first pressure drop is determined across at least one of the SCR catalytic converter and the oxidation catalytic converter.

4. The method according to claim 3, wherein the exhaust gas temperature is an exhaust gas temperature prevailing at at least one of the SCR catalytic converter and the oxidation catalytic converter.

5. The method according to claim 1, wherein the predefined pressure limit value is provided in a form of a characteristic map.

6. The method according to claim 1, wherein a future need for regeneration is identified when the second pressure drop exceeds a predefined pressure warning value, the predefined pressure warning value being smaller than the predefined pressure limit value.

7. An exhaust system for an internal combustion engine, comprising
an exhaust particulate filter;
a flow section connected to the exhaust particulate filter in a fluidically unbranched manner;
a first pressure sensor arrangement for sensing a first pressure drop across the flow section, a second pressure sensor arrangement for sensing a second pressure drop at the exhaust particulate filter;
a temperature sensor for sensing an exhaust gas temperature; and
a control device which is coupled to the first pressure sensor arrangement (48), the second pressure sensor arrangement and the temperature sensor in terms of signaling, the control device being configured to
(a) determine an exhaust gas mass flow flowing through the exhaust particulate filter on a basis of the first pressure drop detected by the first pressure sensor arrangement and the exhaust gas temperature sensed by the temperature sensor; and
(b) identify a need for regeneration of the exhaust particulate filter when the second pressure drop detected by the second pressure sensor arrangement exceeds a predefined pressure limit value dependent on the exhaust gas mass flow.

8. The exhaust system according to claim 7, including a further temperature sensor which is arranged in or on the exhaust particulate filter and is connected to the control device in terms of signaling.

9. The exhaust system according to claim 7, wherein at least one of an SCR catalytic converter and an oxidation catalytic converter is arranged in the flow section, the flow section being positioned downstream of the exhaust particulate filter.

10. The exhaust system according to claim 9, wherein the fluidically unbranched manner comprises an unbranched connection having an inlet associated with an outlet from the exhaust particulate filter and an outlet associated with an inlet to the flow section.

11. The exhaust system according to claim 7, wherein the flow section includes at least one catalytic component, and wherein the temperature sensor comprises a first temperature sensor that is positioned downstream of the exhaust particulate filter and upstream of the flow section.

12. The exhaust system according to claim 11, including a second temperature sensor that is positioned upstream of the exhaust particulate filter.

13. The exhaust system according to claim 7, wherein the flow section includes at least one catalytic component, and including a reducing agent dosing device to introduce a volume flow of reducing agent into a mixing section that is downstream of the exhaust particulate filter and upstream of the flow section.

14. The exhaust system according to claim 13, wherein the fluidically unbranched manner comprises the mixing section which has a first end directly associated with an outlet from the exhaust particulate filter and a second end directly associated with an inlet to the flow section.

15. The method according to claim 1, wherein the flow section includes at least one catalytic component, and wherein the fluidically unbranched manner comprises an unbranched connection, and including associating an inlet of the unbranched connection with an outlet from the exhaust particulate filter and associating an outlet of the unbranched connection with an inlet to the flow section.

16. The method according to claim 1, wherein the flow section includes at least one catalytic component, and including positioning a first temperature sensor downstream of the exhaust particulate filter and upstream of the flow section to sense the exhaust gas temperature.

17. The method according to claim 16, including positioning a second temperature sensor upstream of the exhaust particulate filter to sense exhaust gas temperature prior to entering the exhaust particulate filter.

18. The method according to claim 1, wherein the flow section includes at least one catalytic component, and including providing a reducing agent dosing device to introduce a volume flow of reducing agent into a mixing section that is downstream of the exhaust particulate filter and upstream of the flow section.

19. The method according to claim 18, wherein the fluidically unbranched manner comprises the mixing section which has a first end directly associated with an outlet from the exhaust particulate filter and a second end directly associated with an inlet to the flow section.

* * * * *